US008578056B1

(12) United States Patent
Satish et al.

(10) Patent No.: US 8,578,056 B1
(45) Date of Patent: Nov. 5, 2013

(54) OPTIMIZED APPLICATION STREAMING FOR JUST IN TIME COMPILED COMPONENTS

(75) Inventors: Sourabh Satish, Fremont, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1146 days.

(21) Appl. No.: 12/058,896

(22) Filed: Mar. 31, 2008

(51) Int. Cl.
*G06F 9/45* (2006.01)
*G06F 15/16* (2006.01)
*H04J 3/18* (2006.01)

(52) U.S. Cl.
USPC ............ 709/246; 370/477; 709/235; 717/148

(58) Field of Classification Search
USPC .................... 709/246, 235; 370/477; 717/148
See application file for complete search history.

(56) References Cited

U.S. PATENT DOCUMENTS

| | | | | |
|---|---|---|---|---|
| 5,404,510 A * | 4/1995 | Smith et al. ........................... 1/1 |
| 6,110,226 A * | 8/2000 | Bothner ........................ 717/153 |
| 6,151,703 A * | 11/2000 | Crelier ............................ 717/136 |
| 6,158,048 A * | 12/2000 | Lueh et al. ..................... 717/118 |
| 6,305,012 B1 * | 10/2001 | Beadle et al. ................ 717/148 |
| 6,678,715 B1 * | 1/2004 | Ando ............................. 718/105 |
| 6,687,753 B2 * | 2/2004 | Schneider ..................... 709/235 |
| 6,725,215 B2 * | 4/2004 | Yamamoto ............................ 1/1 |
| 6,851,109 B1 * | 2/2005 | Alexander et al. ............ 717/148 |
| 6,859,649 B1 * | 2/2005 | Denenberg et al. ........... 455/406 |
| 6,996,814 B2 * | 2/2006 | Bak ............................... 717/148 |
| 7,152,116 B1 * | 12/2006 | Austin et al. .................. 709/245 |
| 7,213,240 B2 * | 5/2007 | Wong et al ..................... 717/148 |
| 7,287,082 B1 * | 10/2007 | O'Toole, Jr. ................... 709/228 |
| 7,373,415 B1 * | 5/2008 | DeShan et al. ................ 709/231 |
| 7,380,250 B2 * | 5/2008 | Schechter et al. ............ 719/328 |
| 7,434,212 B2 * | 10/2008 | Wang ............................ 717/148 |
| 7,444,337 B2 * | 10/2008 | Zhou et al. ........................... 1/1 |
| 7,490,320 B2 * | 2/2009 | Kielstra et al. ................ 717/148 |
| 7,530,059 B2 * | 5/2009 | Kielstra et al. ................ 717/148 |
| 7,561,081 B2 * | 7/2009 | Krimerman et al. .......... 341/106 |
| 7,650,599 B2 * | 1/2010 | Smith et al. ................... 717/146 |
| 7,665,079 B1 * | 2/2010 | Yasue et al. ................... 717/160 |
| 7,685,565 B1 * | 3/2010 | Kawachiya ................... 717/110 |
| 7,752,256 B2 * | 7/2010 | Bloch et al. ................... 709/203 |
| 2001/0020255 A1 * | 9/2001 | Hofmann et al. ............. 709/318 |
| 2002/0078253 A1 * | 6/2002 | Szondy et al. ................ 709/315 |
| 2002/0103692 A1 * | 8/2002 | Rosenberg et al. ............. 705/10 |
| 2002/0133635 A1 * | 9/2002 | Schechter et al. ............ 709/310 |
| 2002/0184618 A1 * | 12/2002 | Bala et al. ..................... 717/148 |
| 2003/0028455 A1 * | 2/2003 | Yamaguchi et al. ............ 705/35 |
| 2003/0117651 A1 * | 6/2003 | Matraszek et al. ........... 358/1.18 |

(Continued)

*Primary Examiner* — Tonia L Dollinger
*Assistant Examiner* — Daniel C Murray
(74) *Attorney, Agent, or Firm* — McKay and Hodgson, LLP; Serge J. Hodgson; Sean P. Lewis

(57) ABSTRACT

A request to send a JIT component to a streaming client is received. A network capability rating of the network over which the JIT component is to be sent to the streaming client is determined, and a client capability rating of the streaming client is determined. A transmission language format in which to send the JIT component to the streaming client is determined based on at least the network capability rating and the client capability rating. The JIT component is obtained in the transmission language format and sent to the streaming client over the network. In some embodiments, a transmission language format is determined for each sub-component of the component based on the network capability rating, the streaming client rating, and a sub-component characteristic rating.

15 Claims, 3 Drawing Sheets

(56) References Cited

U.S. PATENT DOCUMENTS

| | | | |
|---|---|---|---|
| 2003/0182413 A1* | 9/2003 | Allen et al. | 709/223 |
| 2003/0186704 A1* | 10/2003 | Tamura et al. | 455/450 |
| 2003/0195923 A1* | 10/2003 | Bloch et al. | 709/203 |
| 2004/0196852 A1* | 10/2004 | Aksu et al. | 370/395.21 |
| 2005/0050528 A1* | 3/2005 | Wang | 717/148 |
| 2005/0203962 A1* | 9/2005 | Zhou et al. | 707/200 |
| 2005/0246451 A1* | 11/2005 | Silverman et al. | 709/231 |
| 2006/0026573 A1* | 2/2006 | Smith et al. | 717/140 |
| 2006/0190934 A1* | 8/2006 | Kielstra et al. | 717/148 |
| 2006/0190935 A1* | 8/2006 | Kielstra et al. | 717/148 |
| 2006/0206601 A1* | 9/2006 | Shvodian | 709/223 |
| 2006/0258375 A1* | 11/2006 | Wilbrink et al. | 455/456.3 |
| 2007/0067807 A1* | 3/2007 | O'Neil | 725/62 |
| 2007/0283048 A1* | 12/2007 | Theimer et al. | 709/246 |
| 2008/0204283 A1* | 8/2008 | Krimerman et al. | 341/60 |
| 2009/0037891 A1* | 2/2009 | Wang | 717/148 |
| 2009/0222798 A1* | 9/2009 | Iguchi et al. | 717/137 |
| 2009/0265696 A1* | 10/2009 | Grice | 717/156 |
| 2009/0300167 A1* | 12/2009 | Jones et al. | 709/224 |
| 2010/0095284 A1* | 4/2010 | Herring et al. | 717/148 |
| 2010/0115501 A1* | 5/2010 | Partridge et al. | 717/148 |
| 2010/0122242 A1* | 5/2010 | Jiva | 717/148 |

\* cited by examiner

OPTIMIZED APPLICATION STREAMING FOR JUST IN TIME COMPILED COMPONENTS

BACKGROUND OF THE INVENTION

1. Field of the Invention

The present invention relates to network streaming. More particularly, the present invention relates to streaming of just-in-time compiled components.

2. Description of Related Art

Just-in-time (JIT) compiled components, such as Microsoft®.NET assemblies and Sun® Java components, are typically streamed in a partially compiled intermediate language format, such as CIL (Common Intermediate Language) and Javabyte code, respectively. The intermediate language format is streamed from a streaming server to a streaming client, such as an end user device. A JIT compiler on the streaming client then further compiles the intermediate language format to generate native binary machine code that is executed by the streaming client. The native binary machine code is often larger than the intermediate language format. This is especially true of 64-bit platforms in which the native binary machine code instructions are twice as large as a 32-bit format of the intermediate language.

Accordingly, deployment of a JIT component from a streaming server to a streaming client, such as an end user device, utilizing the intermediate language format utilizes less network resources during transmission. However, typically a user experience of start up of the JIT component is delayed at the streaming client because the streaming client must compile the intermediate language format into native binary machine code that can be executed by the streaming client.

SUMMARY OF THE INVENTION

Embodiments in accordance with the invention determine a transmission language format in which to send a JIT component, such as an assembly or module of an assembly, to a streaming client so as to optimize the user experience, for example, to optimize how quickly the user experiences start up of the JIT component.

According to one embodiment, a method includes receiving a request to send a JIT component to a streaming client; determining a network capability rating of the network over which the JIT component is to be sent to the streaming client; determining a client capability rating of the streaming client; determining a transmission language format in which to send the JIT component to the streaming client based on at least the network capability rating and the client capability rating; obtaining the JIT component in the determined transmission language format; and sending the JIT component in the transmission language format to the streaming client over the network. In some embodiments, the transmission language format is an intermediate language format of the component. In some embodiments, the transmission language format is a pre-compiled native binary code format of the component.

According to another embodiment, a method includes receiving a request to send a JIT component to a streaming client; determining a network capability rating of the network over which the JIT component is to be sent to the streaming client; determining a client capability rating of the streaming client; determining each sub-component of the JIT component; and for each sub-component of the JIT component, the method further includes: determining a sub-component characteristic rating; determining a transmission language format in which to send the sub-component to the streaming client based on at least the network capability rating, the client capability rating, and the sub-component characteristic rating; obtaining the sub-component in the transmission language format; and sending the sub-component in the transmission language format to the streaming client over the network. In some embodiments, the transmission language format is an intermediate language format of the sub-component. In some embodiments, the transmission language format is a pre-compiled native binary code format of the sub-component.

Embodiments in accordance with the invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Generally viewed, there are two general code formats in which a JIT component can be streamed over a network to a streaming client: a pre-compiled native binary code format, and an intermediate language format. Typically, the pre-compiled native binary code format is larger than the intermediate language format of the JIT component. Thus, more network resources are typically utilized to send a pre-compiled native binary code format of a component from a streaming server to a streaming client than are utilized to send an intermediate language format of the component.

When the JIT component is received by the streaming client, fewer processing resources of the streaming client are utilized to process the pre-compiled native binary code format than are utilized to process the intermediate language format. When a JIT component is sent in the intermediate language format, the streaming client must utilize a local compiler to convert the intermediate language format to a native binary code format executable by the streaming client. Thus, the user start up experience of the component is delayed by the processing of the intermediate language format to the native binary code format.

When the pre-compiled native binary code format is instead sent, the streaming client does not need to utilize the local compiler, and can simply execute the pre-compiled native binary code format. Thus, the user start up experience of the component is faster in comparison with that of the intermediate language format, as less streaming client resources are utilized to process the pre-compiled native binary code format. Further, if the streaming client is a slow device, the user start up experience may be even further slowed due to slower processing as compared to processing by a fast device.

When streaming JIT components from a streaming server over a network to a streaming client, the user start up experience time may also differ depending on the network capabilities. For example, given a fast network transmission link between the streaming server and the streaming client, the user start up experience can be faster than over a slow transmission link.

Figure 2:
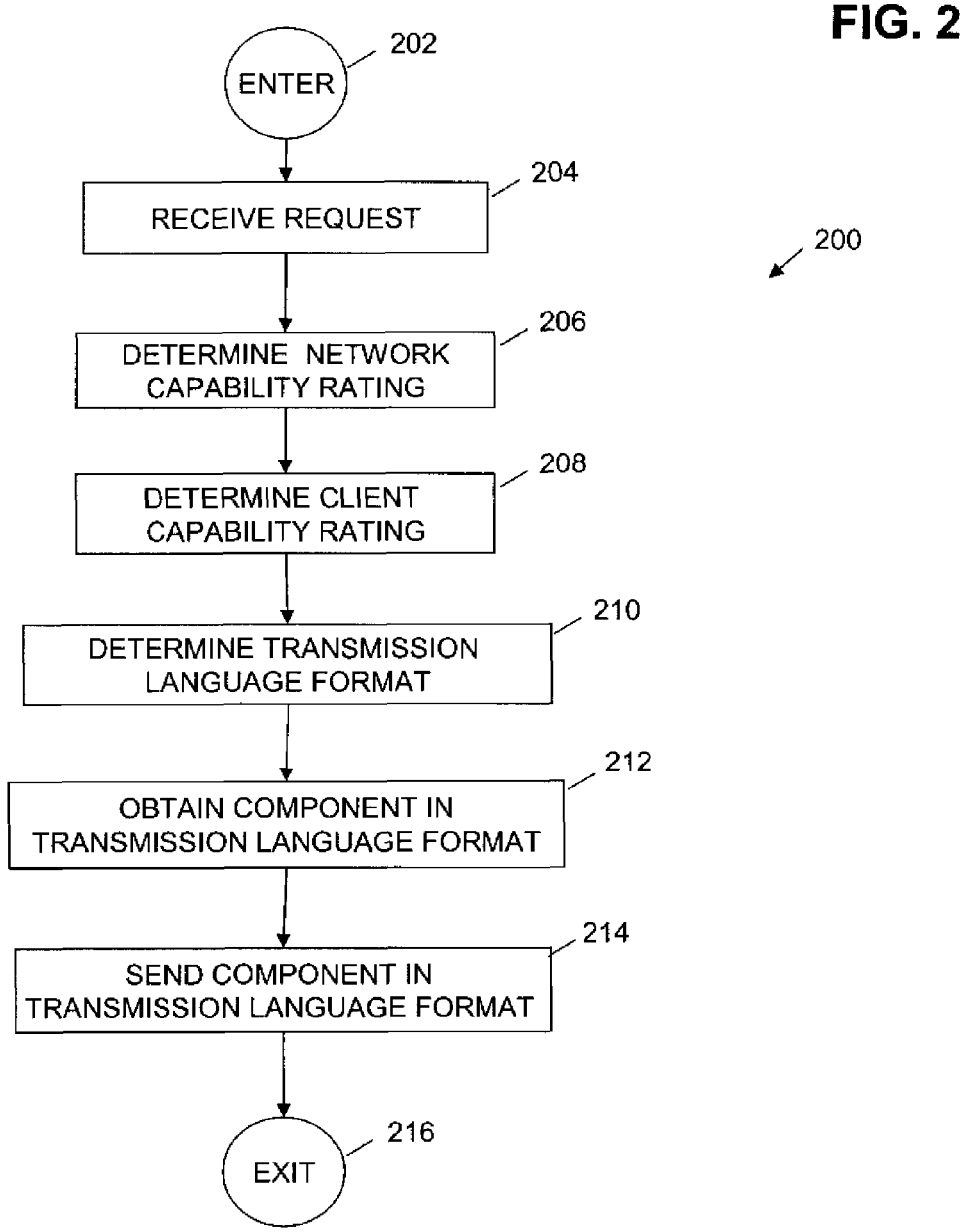
FIG. 2 illustrates a process flow diagram of a method for optimizing the streaming of a just-in-time (JIT) component over a network in accordance with one embodiment of the invention.

In one embodiment, referring generally to FIG. 2, in one embodiment, a request to stream a just-in-time (JIT) component to a streaming client over a network is received (operation 204). A client capability rating of the streaming client is determined, such as from a database or from information in the request (operation 206). The network capability rating of the network is determined, such as from a database or by performing a network test (operation 208). A transmission language format for the JIT component is determined based on at least the client capability rating and the network capability rating (operation 210). The JIT component is obtained in the transmission language format (operation 212), and the JIT component is sent in the transmission language format to the streaming client over the network (operation 214).

Figure 3:
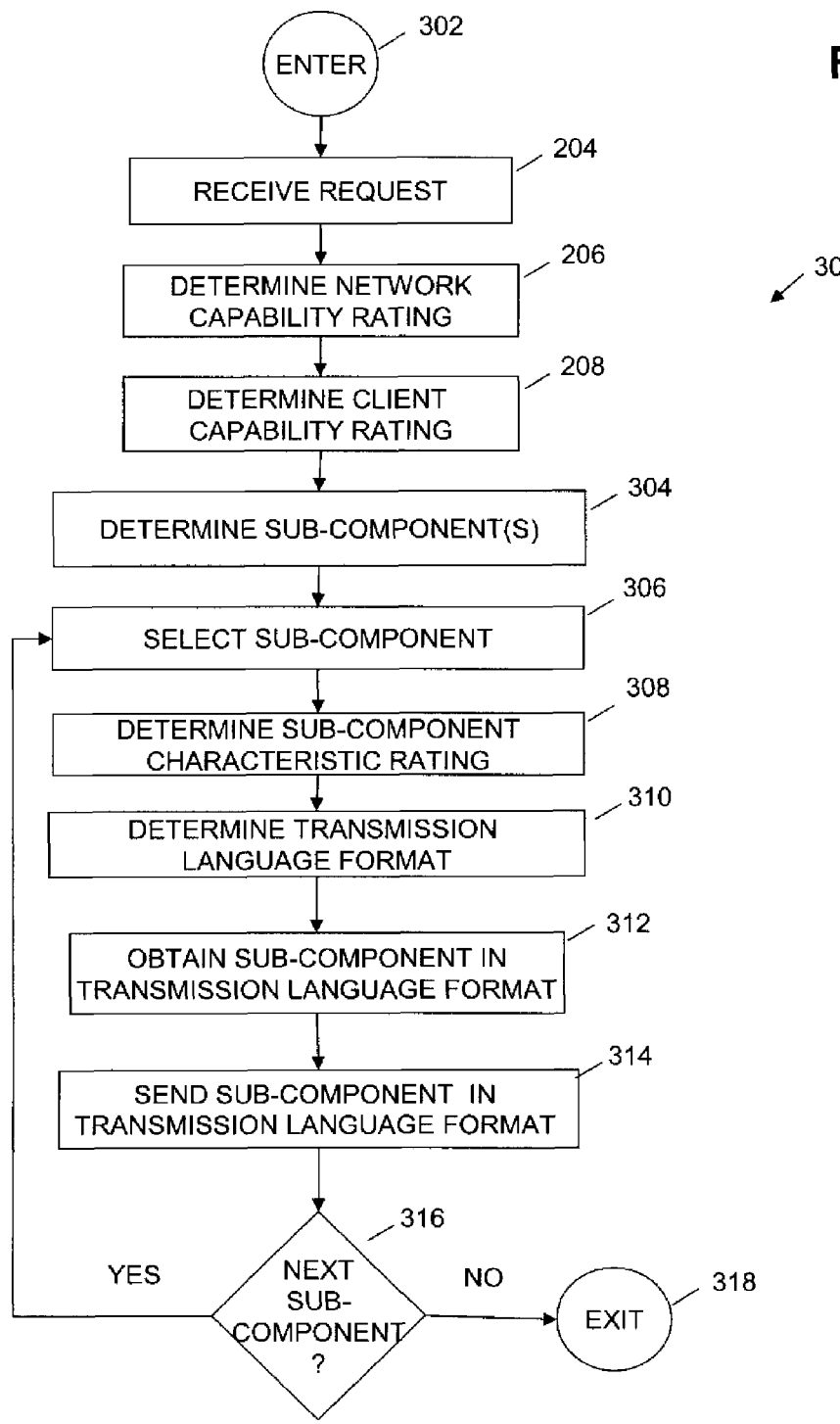
FIG. 3 illustrates a process flow diagram of a method for optimizing the streaming of sub-components of a just-in-time (JIT) component over a network in accordance with another embodiment of the invention.

In another embodiment, referring generally to FIG. 3, in one embodiment, a request to stream a just-in-time (JIT) component to a streaming client over a network is received (operation 204). A client capability rating of the streaming client is determined, such as from a database or from information in the request (operation 206). A network capability rating of the network is determined, such as from a database or by performing a network test (operation 208). Each sub-component of the component is determined (operation 304), and for each sub-component of the component, the method further includes: determining at least one sub-component characteristic rating for the sub-component; determining the transmission format of the sub-component, based on at least the client capability rating, the network capability rating, and the sub-component characteristic rating (operation 310); obtaining the sub-component in the transmission language format (operation 312), and sending the sub-component in the transmission language format to the streaming client over the network (operation 314).

Figure 1:
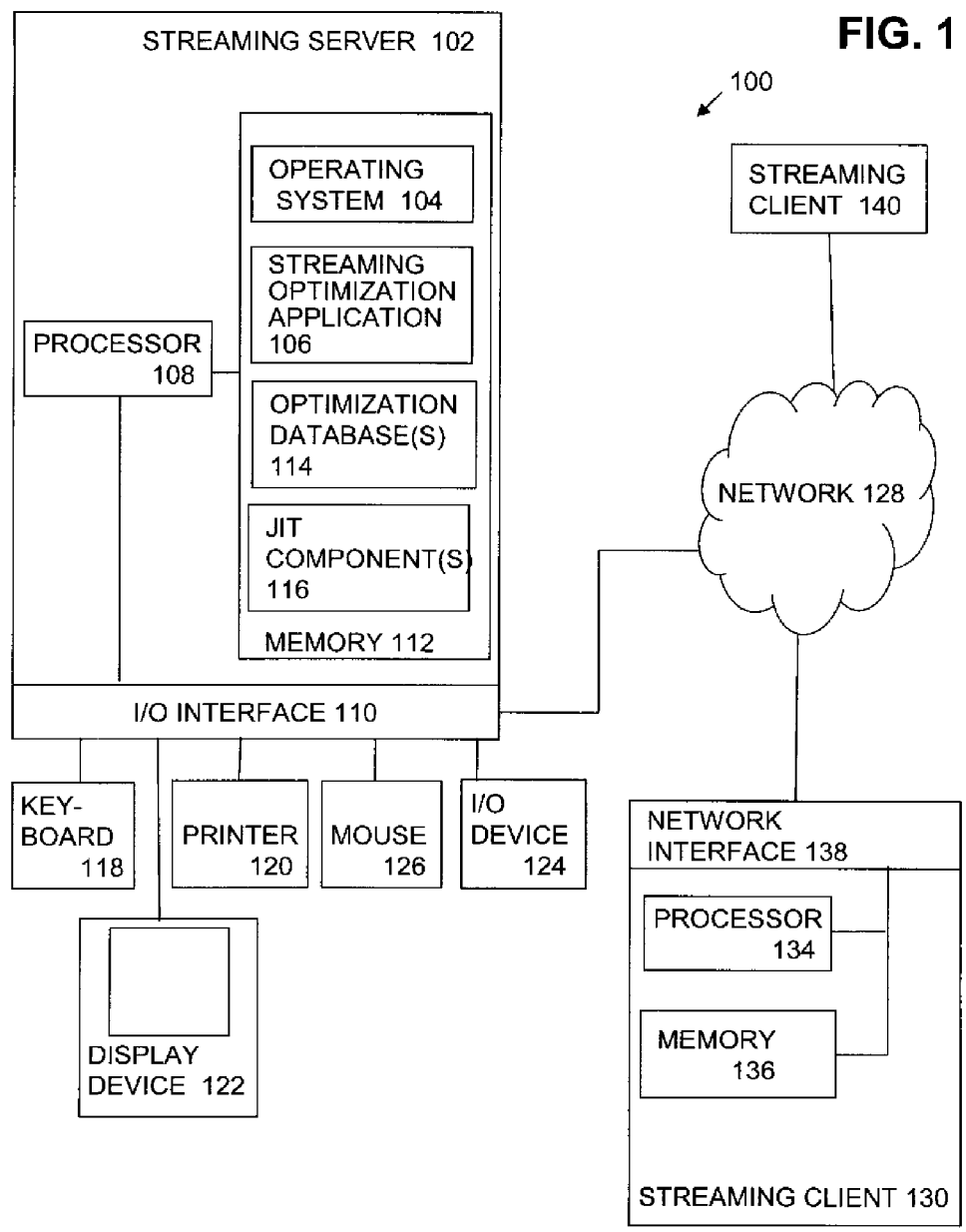
FIG. 1 is a diagram of a computer system including a streaming optimization application executing on a streaming server in accordance with one embodiment of the invention.

Referring more particularly now to FIG. 1, FIG. 1 is a diagram of a computer system 100 including a streaming optimization application 106 executing on a streaming server 102, e.g., a first computer system, in accordance with one embodiment of the present invention. In the present embodiment, streaming server 102 typically includes a central processing unit (CPU) 108, hereinafter processor 108, an input/output (I/O) interface 110, a memory 112, and an operating system 104. In one embodiment, streaming server 102 includes a compiler (not shown) that can be used to compile an intermediate language format of a JIT component to a native binary code format. In one embodiment, memory 112 of streaming server 102 further includes streaming optimization application 106, one or more optimization database(s) 114, and one or more JIT component(s) 116, e.g., content, such as applications. In one embodiment, optimization database(s) 114 and/or JIT component(s) 116 are part of streaming optimization application 106.

In one embodiment, optimization database(s) 114 include one or more databases used by streaming optimization application 106 in determining a transmission language format in which to send a component and/or sub-component(s) to streaming client 130. For example, optimization database(s) 114 can include: a network capability rating database which lists network capability ratings associated with individual networks; a client capability rating database which lists client capability ratings associated with individual streaming clients; a sub-component characteristic rating database which lists sub-component characteristic ratings associated with individual sub-components of a JIT component; and a transmission language format database, such a lookup table, for determining a transmission language format in which to send a JIT component or sub-component over the network to a streaming client.

In one embodiment, JIT component(s) 116 include one or more formats of one or more JIT components and/or JIT sub-components. For example, for a JIT component, JIT component(s) 116 can include a pre-compiled native binary code format of the JIT component and an intermediate language format of the JIT component. In another example, JIT components(s) 116 can further include a native binary code format of each JIT sub-component and an intermediate language format of each JIT sub-component. In one embodiment, streaming optimization application 106 is stored in memory 112 of streaming server 102 and executed on streaming server 102.

In one embodiment, memory 112 includes storage media (not shown) for permanent storage of files, sometimes called non-volatile memory, non-temporary storage memory, non-temporary storage media, or permanent storage memory. For example, in one embodiment, the storage media is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of streaming server 102.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of streaming server 102.

Streaming server 102 may further include standard devices like a keyboard 118, a mouse 126, a printer 120, and a display device 122, as well as, one or more standard input/output (I/O) devices 124, such as a compact disk (CD) or DVD drive, floppy disk drive, or other digital or waveform port for inputting data to and outputting data from streaming server 102. In one embodiment, streaming optimization application 106 is loaded onto streaming server 102 via I/O device 124, such as from a CD, DVD or floppy disk containing streaming optimization application 106.

In one embodiment, streaming server 102 is coupled to a streaming client 130 of system 100 by a network 128. Streaming client 130 typically includes a processor 134, a memory 136, and a network interface 138. In one embodiment, streaming client 130 includes a compiler (not shown) that can be used to compile an intermediate language format of a JIT component to a native binary code format. Streaming client 130 may further include standard devices such as a keyboard, a mouse, a printer, a display device and an I/O device(s). The various hardware components of streaming client 130 are not illustrated to avoid detracting from the principles of the invention.

In one embodiment, streaming client 130 stores information (not shown) identifying its client capability rating, such as stored in a memory structure in memory 136. In some embodiments, streaming client 130 stores information (not shown) identifying a network capability rating of the network used to connect it with streaming server 102, e.g., a network capability rating of network 128.

Streaming server 102 can also be coupled to other streaming clients of system 100, such as one or more additional streaming client(s), such as streaming client 140, by network 128. In one embodiment, streaming client 140 is similar to streaming client 130 and, for example, includes a central processing unit, an input output (I/O) interface, and a memory.

Streaming client 140 may further include standard devices such as a keyboard, a mouse, a printer, a display device and an I/O device(s). The various hardware components of streaming client 140 are not illustrated to avoid detracting from the description of the invention.

Network 128 can be any network or network system that is of interest to a user. In various embodiments, network interface 138 and I/O interface 110 include analog modems, digital modems, or a network interface card. The particular type, and configuration, of streaming server 102, streaming client 140, and streaming client 130 are not essential to the present invention.

In the following embodiments, a JIT component, also simply termed a component, can be a single binary or a collection of related binaries. One example of a component is a Microsoft®.NET assembly. Another example of a component is a Sun® Java component. Herein a JIT sub-component, also simply termed a sub-component, is a portion of a JIT component. Thus, a JIT component is composed of one or more sub-components. For example, a Microsoft®.NET assembly can be composed of one or more modules, i.e., sub-components, such as a dll or executable. As another example, a Sun° Java component can be composed of one or more modules, i.e., one or more sub-components.

FIG. 2 illustrates a flow diagram of a method 200 in accordance with one embodiment of the invention. Referring now to FIGS. 1 and 2 together, in one embodiment, execution of streaming optimization application 106 by processor 108 results in the operations of method 200 as described below. In one embodiment, method 200 is entered at an ENTER operation 202 and processing transitions to a RECEIVE REQUEST operation 204.

In RECEIVE REQUEST operation 204, a request is received at streaming server 102 from a streaming client, such as streaming client 130. In one embodiment, the request identifies the streaming client and the network of the streaming client. For example, the request identifies streaming client 130 and the transmission path to streaming client 130.

In some embodiments, the request further includes a client capability rating associated with streaming client 130. For example, in one embodiment, the client capability rating associated with streaming client 130 can identify streaming client 130 as a fast device or a slow device. In other embodiments, the client capability rating can identify the type of device or a performance parameter of streaming client 130.

In some embodiments, the request further includes a network capability rating associated with network 128. For example, in one embodiment, the network capability rating associated with network 128 identifies network 128 as a fast transmission link or a slow transmission link. From RECEIVE REQUEST operation 204, processing transitions to a DETERMINE NETWORK CAPABILITY RATING operation 206.

In DETERMINE NETWORK CAPABILITY RATING operation 206, streaming optimization application 106 determines the network capability rating of the network, e.g., network 128, connecting streaming server 102 to streaming client 130. In one embodiment, streaming optimization application 106 determines the network to be used for transmitting the requested JIT component to streaming client 130. For example, in one embodiment, streaming server 102 obtains the network path from the request and looks up a network capability rating associated with the network path in a database, such as in a network capability rating database of optimization database(s) 114. In some instances, where a major carrier network is identified, just the major carrier network is looked up.

In one embodiment, the network capability database includes network capability ratings associated with one or more networks, and/or network paths utilized by streaming server 102 for sending JIT components to streaming clients. In one embodiment, network capability rating database is a look up table.

In one embodiment, streaming optimization application 106 obtains the network capability rating from the request.

In another embodiment, streaming optimization application 106 performs or initiates a network test to determine a network capability rating for the network path to streaming client 130. Network tests to determine one or more network capabilities, such as speed and throughput, are well known to those of skill in the art and not further detailed herein to avoid detracting from the description of the invention. From DETERMINE NETWORK CAPABILITY RATING operation 206, processing transitions to a DETERMINE CLIENT CAPABILITY RATING operation 208.

In DETERMINE CLIENT CAPABILITY RATING operation 208, streaming optimization application 106 determines the client capability rating. In one embodiment, where streaming client 130 includes its client capability rating in the request, streaming optimization application 106 obtains the client capability rating from the request. In another embodiment, where streaming client 130 does not include a client capability rating in the request, streaming optimization application 106 identifies streaming client 130 and looks up a client capability rating associated with streaming client 130 in a database, such as in a client capability rating database found in optimization database(s) 114.

In one embodiment, optimization database(s) 114 includes a client capability rating database having client capability ratings associated with one or more streaming clients supported by streaming server 102. From DETERMINE CLIENT CAPABILITY RATING operation 208, processing transitions to a DETERMINE TRANSMISSION LANGUAGE FORMAT operation 210.

In DETERMINE TRANSMISSION LANGUAGE FORMAT operation 210, streaming optimization application 106 determines the transmission language format in which to send the JIT component to the requesting streaming client 130 over the network based on at least the client capability rating and the network capability rating. Determination of the transmission language format utilizing at least the client capability rating and the network capability rating can be determined utilizing a variety of decision techniques.

For example, in one embodiment, streaming optimization application 106 references a transmission language format database in optimization database(s) 114 and obtains a transmission language format associated with the client capability rating and the network capability rating. For example, the transmission language format database can be a listing, a look up table, or other suitable format for determining a transmission language format based on a client capability rating and a network capability rating.

In another embodiment, streaming optimization application 106 inputs the client capability rating and the network capability rating into an algorithm which generates a selection of a transmission language format. In a further embodiment, streaming optimization application 106 inputs the client capability rating and the network capability rating into an algorithm which generates a transmission language format value. Streaming optimization application 106 then looks up the corresponding transmission language format associated with the obtained transmission language format value in a transmission language format value database. In one embodiment, the transmission language format value database is located in optimization database(s) 114.

Examples of selecting a transmission language format based on the network capability rating and the client capability rating are described below. In the following examples, it is assumed a network capability rating is either fast or slow and that a client capability rating is also either fast or slow.

In one embodiment, when a network capability rating is fast and when a client capability rating is fast, the transmission language format selected is an intermediate language format. In another embodiment, when a network capability rating is fast and when a client capability rating is slow, the transmission language format selected is an intermediate language format. In a further embodiment, when a network capability rating is slow and when a client capability rating is fast, the transmission language format selected is an intermediate language format. In a still further embodiment, when a network capability rating is slow and when a client capability rating is slow, the transmission language format selected is a pre-compiled native binary code format. From DETERMINE TRANSMISSION LANGUAGE FORMAT operation 210, processing transitions to an OBTAIN COMPONENT IN TRANSMISSION LANGUAGE FORMAT operation 212.

In OBTAIN COMPONENT IN TRANSMISSION LANGUAGE FORMAT operation 212, streaming optimization application 106 obtains the JIT component in the transmission language format determined in operation 210. For example, in one embodiment, streaming optimization application 106 selects a stored version of the JIT component in the determined transmission language format, e.g., an intermediate language format and/or a pre-compiled native binary format. Thus, in one embodiment, streaming optimization application 106 includes, or has access to JIT component(s) 116.

In another embodiment, streaming optimization application 106 includes or has access to software or hardware which generates the JIT component in an intermediate language format and/or a pre-compiled native binary format. From OBTAIN COMPONENT IN TRANSMISSION LANGUAGE FORMAT operation 212, processing transitions to a SEND COMPONENT IN TRANSMISSION LANGUAGE FORMAT operation 214.

In SEND COMPONENT IN TRANSMISSION LANGUAGE FORMAT operation 214, streaming optimization application 106 sends the JIT component obtained in operation 212 to streaming client 130 over the network, e.g., network 128. From SEND COMPONENT IN TRANSMISSION LANGUAGE FORMAT operation 214, processing transitions to an EXIT operation 216, with processing exiting method 200, or optionally returning to operation 204 on receipt of a next request.

In another embodiment of the invention, rather than sending the entire JIT component in a single transmission language format, each sub-component that composes a JIT component is individually evaluated to determine a transmission language format. Thus, for example, sub-components of a JIT component that allow a user to first experience an application start up can be sent in a pre-compiled native binary code transmission language format, but other sub-components of the JIT component, such as tutorial components, can be sent in an intermediate language format, as a quick user start up experience is typically less important for tutorials.

FIG. 3 illustrates a process flow diagram of a method 300 for optimizing the streaming of sub-components of a just-in-time (JIT) component over a network in accordance with another embodiment of the invention. Referring now to FIGS. 1 and 3 together, in one embodiment, execution of streaming optimization application 106 by processor 108 results in the operations of method 300 as described below. In one embodiment, method 300 is entered at an ENTER operation 302 and processing transitions to RECEIVE REQUEST operation 204.

In RECEIVE REQUEST operation 204, a request is received by streaming optimization application 106 from a streaming client, such as streaming client 130, as earlier described herein with reference to method 200, and hereby incorporated by reference. From RECEIVE REQUEST operation 204, processing transitions to DETERMINE NETWORK CAPABILITY RATING operation 206.

In DETERMINE NETWORK CAPABILITY RATING operation 206, streaming optimization application 106 determines the network capability rating of the network connection to streaming client 130 as earlier described herein with reference to method 200, hereby incorporated by reference. From DETERMINE NETWORK CAPABILITY RATING operation 206, processing transitions to a DETERMINE CLIENT CAPABILITY RATING operation 208.

In DETERMINE CLIENT CAPABILITY RATING operation 208, streaming optimization application 106 determines the streaming client capability rating for the requesting streaming client as earlier described with reference to FIG. 2, hereby incorporated by reference. From DETERMINE CLIENT CAPABILITY RATING operation 208, processing transitions to a DETERMINE SUB-COMPONENT(S) operation 304.

In DETERMINE SUB-COMPONENT(S) operation 304, the individual sub-component(s) that compose the requested JIT component are determined. In one embodiment, the sub-components are looked up in a sub-component database. In one embodiment, the sub-component database is a database in optimization database(s) 114.

In one embodiment, sub-component database includes entries of JIT components and the associated sub-components. In one embodiment, the sub-component database further includes a sub-component characteristic rating associated with each identified sub-component. For example, the sub-component characteristic rating can rate the sub-component as important or not important to a user start up experience.

In one embodiment, streaming optimization application 106 looks up the requested component in the sub-component database and obtains the listing of each sub-component associated with the requested component, i.e., a sub-component listing. In one embodiment, the sub-component listing is based on an intermediate language format of the component. In another embodiment, the sub-component listing is based a pre-compiled native binary code format of the component. In one embodiment, the sub-component listing is at least temporarily stored in or accessible by streaming optimization application 106. From DETERMINE SUB-COMPONENT(S) operation 304, processing transitions to a SELECT SUB-COMPONENT operation 306.

In SELECT SUB-COMPONENT operation 306, a sub-component from the sub-component list is obtained. Thus, for example, in one embodiment, initially a first sub-component is selected for processing. On subsequent selections, a next sub-component in the sub-component listing is selected. From SELECT SUB-COMPONENT operation 306, processing transitions to a DETERMINE SUB-COMPONENT CHARACTERISTIC RATING operation 308.

In DETERMINE SUB-COMPONENT CHARACTERISTIC RATING operation 308, the sub-component characteristic rating for the sub-component selected in operation 306 is determined. In one embodiment, streaming optimization application 106 looks up the sub-component characteristic rating associated with the selected component in the sub-component characteristic database, such as in optimization database(s) 114. Thus, for example, a sub-component characteristic can indicate whether the sub-component is important or not important in creating a user start up experience. From DETERMINE SUB-COMPONENT CHARACTERISTIC RATING operation 308, processing transitions to a DETERMINE TRANSMISSION LANGUAGE FORMAT operation 310.

In DETERMINE TRANSMISSION LANGUAGE FORMAT operation 310, streaming optimization application 106 determines the transmission language format in which to send the sub-component to the requesting streaming client 130 over network 128 based on at least the client capability rating, the network capability rating, and the sub-component characteristic rating. Determination of the transmission language format utilizing at least the client capability rating, the network capability rating, and the sub-component characteristic rating can be determined utilizing a variety of decision techniques.

For example, in one embodiment, streaming optimization application 106 references a transmission language format database in optimization database(s) 114 and obtains a transmission language format associated with the client capability rating, network capability rating and the sub-component characteristic rating. For example, the transmission language format database can be a listing, a look up grid, or other suitable format for determining a transmission language format based on a client capability rating, a network capability rating, and a sub-component characteristic rating. In another embodiment, streaming optimization application 106 inputs the client capability rating, the network rating, and the sub-component characteristic rating into an algorithm which generates a selection of a transmission language format.

As an example of selecting a transmission language format based on the network capability rating, the client capability rating and the sub-component characteristic rating, where the sub-component characteristic rating indicates important, the pre-compiled native binary code format is always selected. In another example, where the sub-component characteristic rating indicates not important, the intermediate language format is always selected. From DETERMINE TRANSMISSION LANGUAGE FORMAT operation 310, processing transitions to an OBTAIN SUB-COMPONENT IN TRANSMISSION LANGUAGE FORMAT operation 312.

In OBTAIN SUB-COMPONENT IN TRANSMISSION LANGUAGE FORMAT operation 312, streaming optimization application 106 obtains the sub-component in the transmission language format determined in operation 310. For example, in one embodiment, streaming optimization application 106 selects a stored version of the sub-component in the determined transmission language format. Thus, in one embodiment, streaming optimization application 106 includes, or has access to a memory structure such as storage database of one or more versions of sub-components, such as an intermediate language format of the sub-component and/or a pre-compiled native binary code format of the sub-component.

In another embodiment, streaming optimization application 106 includes or has access to software or hardware which generates the sub-component in an intermediate language format and/or a pre-compiled native binary code format. From OBTAIN SUB-COMPONENT IN TRANSMISSION LANGUAGE FORMAT operation 312, processing transitions to a SEND SUB-COMPONENT IN TRANSMISSION LANGUAGE FORMAT operation 314.

In SEND SUB-COMPONENT IN TRANSMISSION LANGUAGE FORMAT operation 314, streaming optimization application 106 sends the sub-component obtained in operation 312, over network 128 to streaming client 130. From SEND SUB-COMPONENT IN TRANSMISSION LANGUAGE FORMAT operation 314, processing transitions to a NEXT SUB-COMPONENT check operation 316.

In NEXT SUB-COMPONENT check operation 316, a determination is made whether a next sub-component for transmission is present in the sub-component listing. If a next sub-component is present ("YES"), from NEXT SUB-COMPONENT check operation 316, processing transitions and returns to SELECT SUB-COMPONENT operation 306, in which a next sub-component is selected and processed as earlier described in operation 306-316. Alternatively, when a next sub-component is not present ("NO"), from NEXT SUB-COMPONENT check operation 316, processing transitions to an EXIT operation 318, with processing exiting method 300, or optionally returning to operation 204 (FIG. 3) on receipt of a next request.

In one embodiment of the invention, streaming optimization application 106 is in memory 112. As used herein, a computer memory refers to a volatile memory, a non-volatile memory, or a combination of the two.

Although streaming optimization application 106 is referred to as an application, this is illustrative only. Streaming optimization application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments in accordance with the present invention may be carried out using any suitable hardware configuration or means involving a personal computer, a workstation, a portable device, or a network of computer devices. Other network configurations other than client-server configurations, e.g., peer-to-peer, web-based, intranet, intranet network configurations, are used in other embodiments.

Herein, a computer program product comprises a medium configured to store or transport computer readable code in accordance with an embodiment of the present invention. Some examples of computer program products are CD-ROM disks, DVDs, ROM cards, floppy disks, magnetic tapes, computer hard drives, and servers on a network. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, streaming optimization application 106 may be stored in memory (not shown) that is physically located in a location different from processor 108. Processor 108 should be coupled to the memory. This could be accomplished in a client-server system, or alternatively via a connection to another computer via modems and analog lines, or digital interfaces and a digital carrier line.

More specifically, in one embodiment, streaming server 102 and/or streaming client 130 is a portable computer, a workstation, a two-way pager, a cellular telephone, a digital wireless telephone, a personal digital assistant, a server computer, an Internet appliance, or any other device that includes components that can execute the functionality of streaming optimization application 106 in accordance with at least one of the embodiments as described herein. Similarly, in another embodiment, streaming server 102 and/or streaming client 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of streaming optimization application 106 in accordance with one embodiment of present invention can be implemented in a wide variety of computer system configurations. In addition, the functionality of streaming optimization application 106 could be stored as different modules in memories of different devices.

For example, streaming optimization application 106 could initially be stored in another streaming server, and then as necessary, a portion of streaming optimization application 106 could be transferred to streaming server 102 and executed on streaming server 102. Consequently, part of the functionality of streaming optimization application 106 would be executed on a processor of the other computer system, and another part would be executed on processor 108 of streaming server 102. In view of this disclosure, those of skill in the art can implement various embodiments of the present invention in a wide-variety of physical hardware configurations using an operating system and computer programming language of interest to the user.

In yet another embodiment, streaming optimization application 106 is stored in memory of another computer system (not shown). Streaming optimization application 106 is transferred over network 128 to memory 112 in streaming server 102. In this embodiment, I/O interface 110 would include analog modems, digital modems, or a network interface card. If modems are used, network 128 includes a communications network, and streaming optimization application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
    receiving a request to stream a just-in-time (JIT) component to a streaming client over a network, wherein the JIT component includes two or more sub-components;
    determining a network capability rating of said network by locating a network entry associated with said network in a network capability rating database, said network entry including said network capability rating of said network;
    determining a client capability rating of said streaming client;
    determining a transmission language format for said JIT component based on at least said network capability rating and said client capability rating;
    obtaining said JIT component in said transmission language format;
    sending said JIT component in said transmission language format to said streaming client over said network; and
    determining each of said two or more sub-components; and for each sub-component:
        determining a sub-component characteristic rating associated with said sub-component where the sub-component characteristic rating is at least partly based on the importance of the given sub-component in optimizing how quickly the user experiences of the JIT component start up;
        determining a transmission language format for said sub-component based on at least said network capability rating, said client capability rating, and said sub-component characteristic rating;
        obtaining said sub-component in said transmission language format; and
    sending said sub-component in said transmission language format to said streaming client over said network.

2. The computer implemented method of claim 1 wherein said transmission language format is an intermediate language format.

3. The computer implemented method of claim 1 wherein said transmission language format is pre-compiled native binary code format.

4. The computer implemented method of claim 1 wherein said determining a transmission language format for said JIT component based on at least said network capability rating and said client capability rating comprises:
    when said network capability rating is fast and said client capability rating is fast, determining said transmission language format is an intermediate language format.

5. The computer implemented method of claim 1 wherein said determining a transmission language format for said JIT component based on at least said network capability rating and said client capability rating comprises:
    when said network capability rating is fast and said client capability rating is slow, determining said transmission language format is a pre-compiled native binary code format.

6. The computer implemented method of claim 1 wherein said determining a transmission language format for said JIT component based on at least said network capability rating and said client capability rating comprises:
    when said network capability rating is slow and said client capability rating is fast, determining said transmission language format is an intermediate language format.

7. The computer implemented method of claim 1 wherein said determining a transmission language format for said JIT component based on at least said network capability rating and said client capability rating comprises:
    when said network capability rating is slow and said client capability rating is slow, determining said transmission language format is an intermediate language format.

8. A computer system comprising:
    a memory having stored therein a streaming optimization application; and
    a processor coupled to said memory, wherein execution of said streaming optimization application generates a method comprising:
    receiving a request to stream a just-in-time (JIT) component to a streaming client over a network, wherein the JIT component includes two or more sub-components;
    determining a network capability rating of said network by locating a network entry associated with said network in a network capability rating database, said network entry including said network capability rating of said network;
    determining a client capability rating of said streaming client;
    determining a transmission language format for said JIT component based on at least said network capability rating and said client capability rating;
    obtaining said JIT component in said transmission language format;

sending said JIT component in said transmission language format to said streaming client over said network; and
determining each of said two or more sub-components;
and for each sub-component:
determining a sub-component characteristic rating associated with said sub-component where the sub-component characteristic rating is at least partly based on the importance of the given sub-component when optimizing how quickly the user experiences of the JIT component start up;
determining a transmission language format for said sub-component based on at least said network capability rating, said client capability rating, and said sub-component characteristic rating;
obtaining said sub-component in said transmission language format; and
sending said sub-component in said transmission language format to said streaming client over said network.

9. The computer system of claim 8 wherein said transmission language format is an intermediate language format.

10. The computer system of claim 8 wherein said transmission language format is a pre-compiled native binary code format.

11. The computer system of claim 8 wherein said determining a transmission language format for said JIT component based on at least said network capability rating and said client capability rating comprises:
when said network capability rating is fast and said client capability rating is fast, determining said transmission language format is an intermediate language format.

12. The computer system of claim 8 wherein said determining a transmission language format for said JIT component based on at least said network capability rating and said client capability rating comprises:
when said network capability rating is fast and said client capability rating is slow, determining said transmission language format is a pre-compiled native binary code format.

13. The computer system of claim 8 wherein said determining a transmission language format for said JIT component based on at least said network capability rating and said client capability rating comprises:
when said network capability rating is slow and said client capability rating is fast, determining said transmission language format is an intermediate language format.

14. The computer system of claim 8 wherein said determining a transmission language format for said JIT component based on at least said network capability rating and said client capability rating comprises:
when said network capability rating is slow and said client capability rating is slow, determining said transmission language format is an intermediate language format.

15. A computer-program product comprising:
a nontransitory computer readable storage medium storing computer program code comprising:
a streaming optimization application for optimizing the end user time experience of a just-in-time (JIT) component received over a network, wherein the JIT component includes two or more sub-components;
said streaming optimization application further for receiving a request to stream said JIT component to said streaming client over said network;
said streaming optimization application further for determining a network capability rating of said network by locating a network entry associated with said network in a network capability rating database, said network entry including said network capability rating of said network;
said streaming optimization application further for determining a client capability rating of said streaming client;
said streaming optimization application further for determining a transmission language format for said JIT component based on at least said network capability rating and said client capability rating;
said streaming optimization application further for obtaining said JIT component in said transmission language format;
said streaming optimization application further for sending said JIT component in said transmission language format to said streaming client over said network; and
said streaming optimization application further for determining each of said two or more sub-components;
and for each sub-component:
determining a sub-component characteristic rating associated with said sub-component where the sub-component characteristic rating is at least partly based on the importance of the given sub-component when optimizing how quickly the user experiences of the JIT component start up;
determining a transmission language format for said sub-component based on at least said network capability rating, said client capability rating, and said sub-component characteristic rating;
obtaining said sub-component in said transmission language format; and
sending said sub-component in said transmission language format to said streaming client over said network.

* * * * *